Nov. 11, 1924.

J. W. SNEDEKER 1,515,316

JOINT FOR BUMPER BARS

Filed April 18, 1924  2 Sheets-Sheet 1

James W Snedeker
INVENTOR

BY [signature]
ATTORNEY

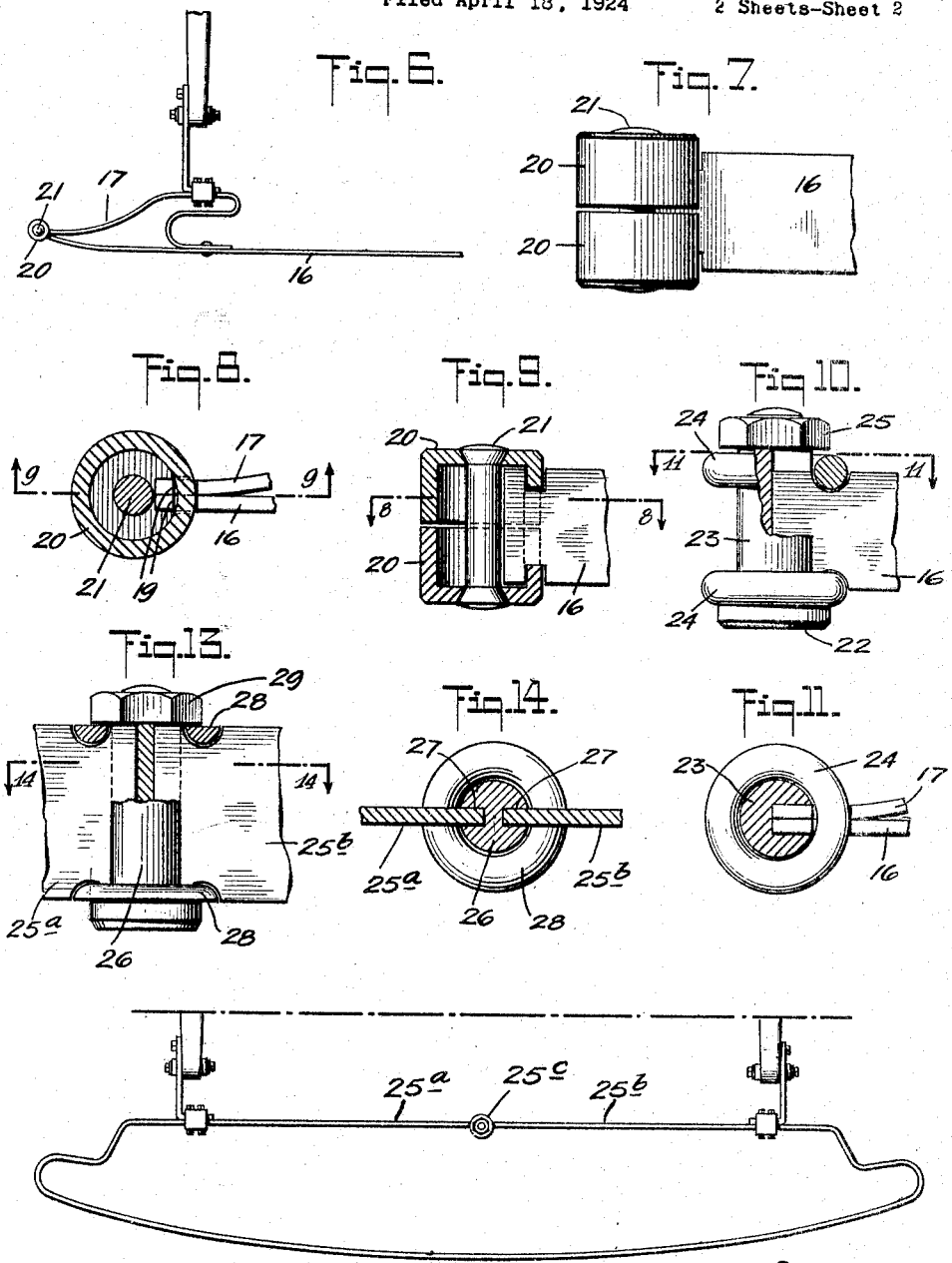

Patented Nov. 11, 1924.

1,515,316

UNITED STATES PATENT OFFICE.

JAMES W. SNEDEKER, OF ADRIAN, MICHIGAN, ASSIGNOR TO PAGE STEEL AND WIRE COMPANY, OF ADRIAN, MICHIGAN, A CORPORATION OF NEW JERSEY.

JOINT FOR BUMPER BARS.

Application filed April 18, 1924. Serial No. 707,351.

*To all whom it may concern:*

Be it known that I, JAMES W. SNEDEKER, a citizen of the United States, residing at Adrian, in the county of Lenawee, State of Michigan, have invented certain new and useful Improvements in Joints for Bumper Bars; and I do hereby declare the following to be a full, clear, and exact description of the invention, such as will enable others skilled in the art to which it appertains to make and use the same.

The object of my invention is the construction of a joint for connected ends of bumper bars, which, while dispensing with the need for welding, yet creates a firm and rigid union proof against the effects of vibration such as noise and looseness, and which may be easily assembled and disassembled.

Referring to the drawings:

Figure 6 is a plan view of one-half a bumper of a different construction than shown in Figs. 1, 2 and 3, and showing incorporated therein another modification of my invention.

Figure 7 is a detailed view of a form of my invention as shown incorporated in Fig. 6.

Figure 8 is a view on the line 8—8 of Fig. 9 and illustrates the form of my invention shown in Figs. 6 and 7.

Figure 9 is a view on the line 9—9 of Fig. 8.

Figure 10 is a detailed view of a modification of the invention of the type shown in Figs. 6, 7, 8 and 9. The parts are shown broken to more clearly illustrate the details.

Figure 11 is a view on the line 11—11 of Fig. 10.

Figure 12 is a plan view of still another type of bumper, and showing still another application of the invention.

Figure 13 is a detailed view of the invention as shown embodied in Fig. 12.

Figure 14 is a view on the line 14—14 of Fig. 13.

Figure 1:
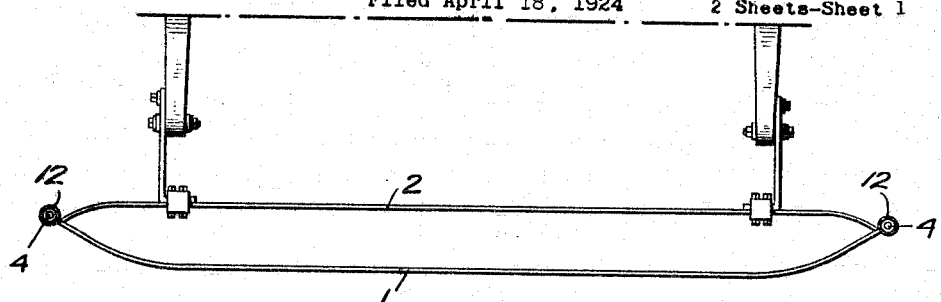
Figure 1 is a plan view of a bumper in which is incorporated one form of my invention.
Figure 2:
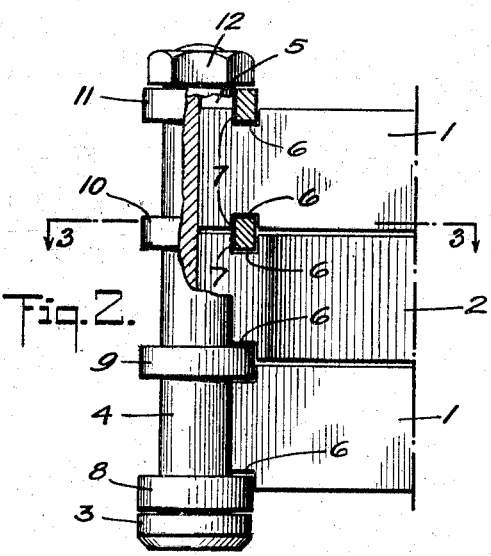
Figure 2 is a detailed view in elevation showing my invention as incorporated in Fig. 1. The parts are shown broken to more clearly illustrate the details.
Figure 3:
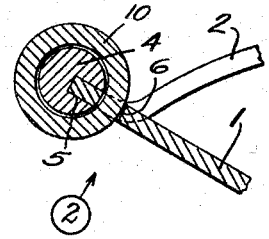
Figure 3 is a view on the lines 3—3 of Fig. 2.
Figure 4:
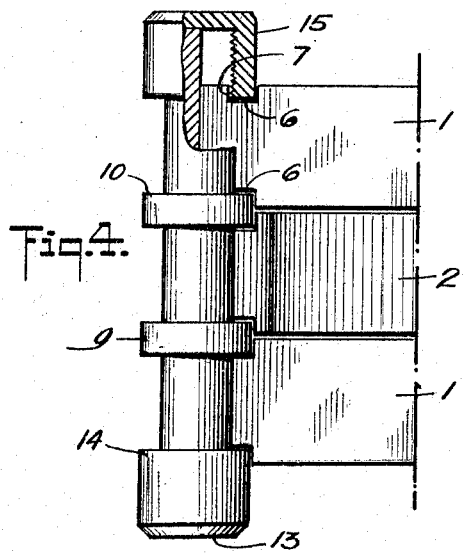
Figure 4 is a detailed view of a modification of the form shown in Figs. 1, 2, and 3. The parts are shown broken to more clearly illustrate the details.
Figure 5:
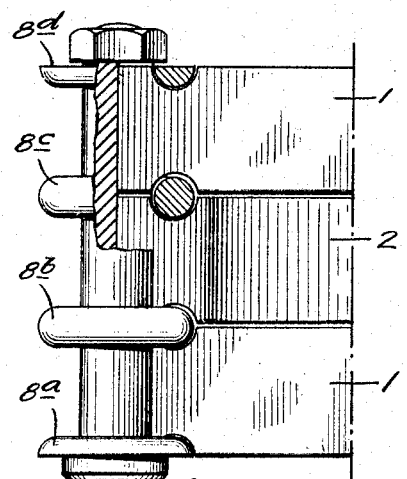
Figure 5 is a detailed view of another modification of my invention. The parts are shown broken to more clearly illustrate the details.

The form shown in Figs. 1, 2 and 3, the form shown in Fig. 4, and also the form shown in Fig. 5, are particularly adaptable for joining the ends of the bars of a bumper of the general type shown in Fig. 1. This type of bumper is characterized by the fact that the front or impact surface is composed of two strips 1, 1 of steel extending the entire length of the bumper and joined at their ends to the end of a rear bar 2. The two front strips are vertically spaced apart usually throughout their length a distance equal to the width of the rear bar, and the end of the rear bar spaces the ends of the front bars, so that the three ends adjoin each other edge to edge.

For forming a rigid union of the three ends a bolt is utilized consisting of a head 3, and a shank or pin 4. The shank or pin 4 of the bolt is grooved or splined as indicated at 5, the groove being of suitable dimensions to comfortably receive the ends of the bars when assembled edge to edge as shown in Fig. 2. Each edge of each bar is notched, as indicated at 6, forming shoulders 7, the shoulders being so positioned that when the end of the bar is inserted in the groove they will be substantially flush with the peripheral surface of the pin. Rings 8, 9, 10 and 11, fitting the pin 4, are provided, and the assembly may be conveniently made by first slipping the lower ring 8 on the pin, then inserting the lowest bar so that one of its notches engages the ring, then slipping the next ring 9, on the pin so that it engages the opposite notch of the lowest bar, and then continuing in the same manner. The whole assembly may be firmly drawn together and tightened by turning down the nut 12.

In the modifications of Fig. 4, the functions of the bolt head 3 and ring 8 of Fig. 2, are performed by the head 13 of the bolt, which is fashioned in such shape as to leave a flange 14 over which the shoulder of the lowermost bar is engaged. In a similar manner the functions of the ring 11 and nut 12 of Fig. 2 are performed by the cap 15, which is screwed down sufficiently to engage the shoulder of the uppermost bar. This construction, as will be observed, reduces the number of parts as compared with the construction of Fig. 2, and results in a more symmetrical and satisfactory appearance.

The construction of Figure 5 is similar to that of Figure 2 with the exception that the rings 8$^b$ and 8$^c$, of circular cross section, take the place of the rings 9 and 10 of rectangular cross section. The rings 8$^a$ and 8$^d$ may be made half round in cross section, if desired. This construction makes possible the use of rings of a standard manufacture.

In Figures 6, 7, 8, and 9 there is illustrated a modification especially suitable for the type of bumper shown in Fig. 6, which includes a single front bar 16, joined to a single rear bar 17. In a joint for bumpers of this character it is preferable that the two bars be joined with their flat faces in contact, as shown in Fig. 8. The groove in this form may be dispensed with, the pin hereinafter mentioned, being of smaller diameter than the interior of the cap 20, 20 as shown. The bars are provided with registering notches 19, and the caps 20, 20, engage the shoulders and are drawn together in locking engagement and so maintained by a rivet 21.

The construction of Figures 10 and 11 is used under substantially similar conditions as the construction of Figs. 6, 7, 8, and 9, and consists of a bolt comprising the head 22, and pin or shank 23 passing through the rings 24. The bumper bars 16 and 17 have semi-circular notches to conform to the rings, and the whole assembly is brought rigidly together by means of the nut 25.

Figures 12, 13, and 14 illustrate an adaptation of the invention which is utilized for the purpose of joining two strips end to end, and is particularly useful in joining the ends of the rear bar of a bumper of the type shown in Fig. 12, the manufacture of which usually involves the bending of a strip to shape in such manner that the ends 25$^a$ and 25$^b$ meet in the rear bar at the point 25$^c$. In such a case as this the bolt 26 is provided with two diametrically opposite grooves 27, 27, into each of which one of the ends to be joined is fitted. Rings 28 are provided, and the assembly is brought firmly and rigidly together as in the previous cases, by tightening down on the nut 29.

While I have shown and described certain specific practical embodiments of my invention, and a number of different applications of it, it is understood that the structural and mechanical features may all be varied in a number of ways and yet not depart from the scope of the claims which are as follows:

1. In a joint for bumper bars a pin provided with a longitudinal groove and slidably fitting rings on said pins, said rings being adapted to engage shoulders on a bumper bar the end of which is inserted in said groove.

2. In a joint for bumper bars, a pin provided with a longitudinal groove, slidably fitting rings on said pin, said rings being adaptable to engage shoulders on the edges of a bumper bar the end of which is inserted in said groove, and means for drawing said rings into and maintaining them in engagement with said shoulders.

3. In a joint for bumper bars, a bar provided with shoulders on the edges thereof and near the ends, rings adapted to engage said shoulders, a pin provided with a longitudinal groove in which the ends of said bumper bars may be inserted, said rings being slidably fitted on said pin.

4. In a joint for flat strip bumper bars a longitudinally grooved pin, a bumper bar having an end adapted to be inserted in the groove, said end being notched on each edge to form shoulders flush with the periphery of said pin, rings slidably fitted on said pin and adapted to engage said shoulders, and means for drawing the said rings into engagement with the said shoulders.

5. In a joint for flat strip bumper bars a plurality of bars the ends of which are notched on each edge forming shoulders, a pin provided with a longitudinal groove into which said ends may be inserted, slidably fitted rings on said pin adapted to engage said shoulders when said ends are inserted in said groove, and means for drawing the rings and bars together into rigid assembly.

6. In a joint for bumper bars a plurality of bars provided with shoulders on the edges thereof and near the ends, a pin provided with a longitudinal groove into which said ends may be inserted edge to edge, slidably fitting rings on said pin adapted to engage said shoulders and secure said ends in said groove, and means for drawing and maintaining the said rings and ends in rigid assembly.

7. A joint for connecting flat strip bumper bars edge to edge, comprising a pin provided with a longitudinal groove adapted to receive the ends of the bars to be joined edge to edge, and rings slidably fitting on said pin and adapted to engage shoulders on the edges of said bars and retain said ends in said groove.

8. A joint for bumper bars comprising a pin, a plurality of bars arranged with their ends in proximity to each other, the edges of said ends being provided with shoulders, and rings on said pin adapted to engage said shoulders.

JAMES W. SNEDEKER.